(12) United States Patent
Garcia Martinez et al.

(10) Patent No.: US 10,390,540 B2
(45) Date of Patent: Aug. 27, 2019

(54) STABILIZED LONGLIFE NON-EDIBLE COLLAGEN CASING READY-TO-STUFF

(75) Inventors: Ion Iñaki Garcia Martinez, Pamplona (ES); Jose Angel Arraras, Pamplona (ES); Ernst Knortzer, Weinheim (DE)

(73) Assignee: NATURIN GMBH & CO., Weinheim (DE)

( * ) Notice: Subject to any disclaimer, the term of this patent is extended or adjusted under 35 U.S.C. 154(b) by 0 days.

(21) Appl. No.: 12/497,608

(22) Filed: Jul. 3, 2009

(65) Prior Publication Data

US 2010/0003380 A1 Jan. 7, 2010

(30) Foreign Application Priority Data

Jul. 7, 2008 (EP) ..................... 08159800

(51) Int. Cl.
*A22C 13/00* (2006.01)
*C08K 5/098* (2006.01)
*C08K 3/105* (2018.01)

(52) U.S. Cl.
CPC .......... *A22C 13/0016* (2013.01); *C08K 5/098* (2013.01); *C08K 3/105* (2018.01)

(58) Field of Classification Search
CPC ....... C08K 3/0083; C08K 5/098; C08L 89/06; A22C 13/0016; A22C 13/02
USPC ........ 428/34.8, 35.2, 35.6, 36.9, 36.92, 402, 428/43; 426/135, 420
See application file for complete search history.

(56) References Cited

U.S. PATENT DOCUMENTS

| | | |
|---|---|---|
| 3,235,641 A | 2/1966 | McKnight |
| 3,361,577 A | 1/1968 | Selwyn et al. |
| 3,413,129 A | 11/1968 | Lieberman |
| 3,579,358 A | 5/1971 | Courts |
| 3,617,312 A | 11/1971 | Rose |
| 3,682,661 A | 8/1972 | Turbak |
| 3,930,035 A | 12/1975 | Burke et al. |
| 3,981,046 A | 9/1976 | Chiu |
| 3,993,790 A * | 11/1976 | Burke ................ A22C 13/0016 426/140 |
| 4,409,251 A | 10/1983 | Higgins |

(Continued)

FOREIGN PATENT DOCUMENTS

| | | | |
|---|---|---|---|
| EP | 1 018 301 | * 7/2000 | ............. A22C 13/00 |
| EP | 1 419 696 B1 | 1/2008 | |

(Continued)

OTHER PUBLICATIONS

Extended European Search Report for Application No. EP 08159800.5, dated Nov. 26, 2008.

*Primary Examiner* — Gerard Higgins
*Assistant Examiner* — Kevin C Ortman, Jr.
(74) *Attorney, Agent, or Firm* — Knobbe, Martens, Olson & Bear, LLP

(57) ABSTRACT

The present invention relates to non-edible collagen casings for food products which do not have to be soaked in water or brine just before stuffing (ready-to-stuff casings), and the method for preparing them. More specifically, the invention refers to a preparation of a stabilized longlife non-edible collagen casing ready-to-stuff comprising a moisture amount between 27% and 50% by weight based on total casing weight and a salt amount between 2,5% and 30% by weight based on dry casing weight, wherein the salt comprises a salt from an organic acid and wherein the casing is packed.

27 Claims, 9 Drawing Sheets

(56) References Cited

U.S. PATENT DOCUMENTS

| | | | |
|---|---|---|---|
| 4,664,861 A | 5/1987 | Pritkin et al. | |
| 4,867,204 A | 9/1989 | Ellis et al. | |
| 6,279,737 B1 | 8/2001 | Long et al. | |

FOREIGN PATENT DOCUMENTS

| | | |
|---|---|---|
| GB | 2 000 424 | 1/1979 |
| GB | 2 000 424 A | 1/1979 |
| SE | 515441 | 8/2001 |

* cited by examiner

STABILIZED LONGLIFE NON-EDIBLE COLLAGEN CASING READY-TO-STUFF

CROSS-REFERENCE TO RELATED APPLICATION

This application claims priority to and the benefit of European Patent Application Number 08159800.5 filed on Jul. 7, 2008, the disclosure of which is incorporated herein by reference in its entirety.

BACKGROUND

Field

The present invention relates to non-edible collagen casings for food products which do not have to be soaked in water or brine just before stuffing (ready-to-stuff casings), and the method for preparing them. More specifically, the invention refers to a preparation of a stabilized longlife non-edible collagen casing ready-to-stuff.

Related Technology

Collagen casings for food products have been used for a long time in sausages production as a substitution of natural casings. Collagen casings show a number of advantages in comparison with natural ones, like increase of stuffing productivity (bigger filling speed and lower frequency of stuffing interruptions due to casing breakages), more homogeneous and stable sausage caliber and length, and improved hygiene.

They are usually made of collagen obtained from bovine or porcine hides, which are washed, treated with alkali and acid, and ground until an extrudable acid gel is obtained. Then, collagen is extruded in a tubular shape film, cross-linked, dried to a low water content and reeled. Those reels are converted to fulfill the final customers' needs. Converting can be made by applying one or more of the following steps: shirring, tying, cutting, sewing, bundling or printing. Processes for production of these casings are described in U.S. Pat. Nos. 3,235,641, 3,579,358 and 3,930,035.

Collagen casings may be edible or non-edible. Non-edible casing is treated as a commodity, which normally shows higher diameter, higher degree of collagen cross-linking, and thicker wall (usually ca. 40-150 µm of a casing with 10-20% of humidity), than edible casing. As a consequence, non-edible casing texture is hard, tough and leathery, without the appropriate textural properties for mastication. So, non-edible casing is not eaten because of their unpleasant mouth feel, and it is normally peeled before the meat product encased therein is consumed. As non-edible casing is intended to be removed before eating the product, it has to be easy and fast peeled from the meat product, and the peeled casing shouldn't show adhered particles of meat. On the contrary, in an edible casing, it is a must to show good adherence to the meat product, like sausages stuffed with natural casing show.

Non-edible collagen casings can be used for the preparation of cooked or dry meat products. Common requirements for both types of application are good filling performance and good casing peelability from the meat product, as has been mentioned before. However, while casing for cooking has to stand the hydrothermal burden during cooking cycle, casing for a dry product has to be able to follow the volume reduction of the meat emulsion due to loss of water during maturation process. Usually two different types of non-edible collagen casing are produced for these different applications, which differ in the cross-linking degree.

The distinction between edible and non-edible collagen casings also affects the stuffing procedure. An edible casing doesn't need to be moistened and softened in water or brine before stuffing. So, those casings are stuffed directly. Non-edible casing has to be moistened and softened by soaking in water or in brine prior filling, in order to give them the necessary flexibility to make possible to put the casing upon the stuffing horn, and avoid casing breakages during stuffing and/or clipping. Low water content makes the casing too brittle and then casing bursts during filling and/or clipping step. Several pre-soaking procedures are applied by the meat-manufacturer to the non-edible collagen casing, prior to stuffing. Commonly brine is used, with different salt concentrations, soaking time and bath temperature, parameters that will depend on casing and converting type, produced sausage, stuffing machine, and other factors. In USA it is general the use of tap water and short soaking times. In the EP 03 445 126 patent a pre-soaking method for non-edible collagen casings is described for reinforcing the clip strength and cooking resistance thereof.

This pre-soaking step before stuffing is a time consuming period, and it needs the installation of tanks and equipment for preparing the brine. Also casings once soaked must be used in a short period of time of maximum one or two days. Additionally, soaking is a source of possible errors, like the lack of control in salt concentration, temperature and soaking exposure time, leading to a heterogeneous product and irregular stuffing performance. It is also a source of potential hygienic problems. Brine can also lead to speed up the corrosion of the stuffing area machinery. As a consequence, an additional cleaning is required in soaking and stuffing areas. Costs involved in the stuffing step of non-edible collagen casings are higher as more time, man power, maintenance, water and salt are required.

Another type of non-edible casings used for preparation of large caliber meat products, like plastic, fibrous and reinforced cellulose casings, have generally also to be moistened in water before stuffing, the same as non-edible collagen casings. Several prior art documents disclose different methods of preparation of a pre-moisturized, ready-to-stuff, plastic, fibrous and reinforced cellulose casings, in order to eliminate the pre-soaking in water prior to filling. Main problem to solve for these casings is the inhibition of microbial and mould or fungi growth in a casing with high water content. Two main different ways are used for preventing spoilage of such ready-to-stuff casings, (1) the use of huge amounts of plasticizers or humectants, like glycerin or propylene glycol, in order to decrease water activity (Aw) of the casing, and (2) the use of antimycotic agents, like alkyl esters of p-hydroxybenzoic acid. Processes for production of above mentioned casings are described in U.S. Pat. Nos. 3,617,312, 3,981,046, 4,409,251, 4,664,861, 4,867,204, and 6,279,737 patents. Plasticizers in huge amount and antimycotic agents could have adverse consequences, like blocking the natural indicators of food spoilage which are necessary for consumer safety, and disturb the normal development of the appropriate mould in the sausage surface, in the case of dry sausages.

In the specific field of non-edible collagen casings, we can find in prior art a successful development of a non-edible collagen ready-to-stuff casing.

SE-515441 describes a method of softening, stabilizing and preserving non-edible collagen casing for food products. Dry collagen casing is treated with a water-containing solution of sodium chloride in a concentration of 5-25% weight with a pH-value of 2,5-5,5 in a quantity large enough to ensure a water content of 30-50% weight and that a surplus of the sodium chloride solution of at least 5% weight remains on the surface of the collagen casing. Following the method described in that patent, it is possible to produce a non-edible collagen casing ready-to-stuff at industrial scale. In fact, round ready-to-stuff non-edible collagen casings were successfully commercialized by AB Tripasin casing Manufacturer Company.

But non-edible collagen casing ready-to-stuff prepared by the method disclosed in SE-515441 patent, showed a high degree of instability. Casings lost properties during stock at industrial scale. In fact, casing tensile strength, a parameter closely related to stuffing and clipping performance, decreased with stock time. Such casing tensile strength decrease was speeded up where temperature of the casing during stock and shipment to the customer was higher. It is likely that this is due to the fact that collagen hydrolysis took place, caused by the high level of water (30-50% weight) of the ready-to-stuff casing, leading to a weaker casing. This effect was enhanced during summer, where environmental temperature is high.

EP 1018301 also discloses a method of preparing a ready-to-stuff non edible collagen casing which does not need any additional soaking step before stuffing. Such casing comprises a moisture amount between 27% and 49% by weight based on total casing weight and a sodium chloride amount between 4 and 20% by weight based on dry casing weight. Dry collagen casing is soaked in an aqueous salt solution which concentration is between 5 and 25% during a period of time between 2 seconds and 60 seconds prior to the packing procedure.

In the case of EP 1018301, it is also possible to produce a non edible collagen casing ready-to-stuff at industrial scale. In fact, round and straight non-edible collagen casings were successfully commercialized by Naturin GmbH & Co casing Manufacturer Company. This casing, however, showed the same problems of instability, as with the product produced following the method described in patent SE-515441, because the amount of water in the casing is also in a high range (27-49% weight).

Due to the instability of non-edible collagen ready-to-stuff casings commercialized so far, there is a need in the market for a stabilized longlife non-edible collagen ready-to-stuff casing, with enough stability to be shipped and stored for a long period non refrigerated, at room temperature, without significant losses of stuffing performance. Such casing will also lead to a cost reduction, because it would not be necessary to prepare cool warehouses for stocking ready-to-stuff casings, neither use refrigerated transport for delivering casings to customers. A stabilized product like this will increase customers' confidence in a non-edible collagen casing ready-to-stuff.

SUMMARY

Some embodiments of the present disclosure provides a stabilized longlife non-edible ready-to-stuff collagen casing characterized in that it comprises a moisture amount from about 27% to about 50% by weight based on total casing weight and a salt amount from about 2.5% to about 30% by weight based on dry casing weight, wherein the salt comprises a salt from an organic acid and wherein the casing is packed.

In one embodiment, the salt from an organic acid can be selected from the group of acetates, citrates, lactate, tartrates, formiates, propionates, glutamates, ascorbates, succinates, malates or mixtures thereof. In another embodiment, the salt from an organic acid can be selected from the group of sodium acetate, sodium citrate, sodium lactate, sodium tartrate, sodium formiate, sodium propionate, sodium glutamate, sodium ascorbate, sodium succinate, sodium malate or mixtures thereof.

In one embodiment, the salt includes a mixture of organic acid salt and inorganic salt. In one embodiment, the inorganic salt can be a neutral inorganic salt, where the neutral inorganic salt can be from the group of chlorides and sulphates, or mixtures thereof. In another embodiment, the neutral inorganic salt can be sodium chloride, sodium sulphate or mixtures thereof.

In one embodiment, the moisture amount can be from about 30% to about 40% by weight based on total casing weight. The amount of salt can be from about 6% to about 15% by weight, based on dry casing weight.

In one embodiment, the casing can be vacuum packed or packed under protective gas, where the protective gas can be, either, carbon dioxide, nitrogen or a mixture of both.

Some embodiments of the present disclosure provides a method for preparing a stabilized longlife non-edible ready-to-stuff collagen casing, where the method includes soaking the casing in an aqueous solution comprising salt in a total concentration from about 5% to about 50% for a period of time ranging from about 20 seconds to about 30 minutes and packaging the resulting casing, wherein the salt comprises a salt from an organic acid salt. In one embodiment of the method, the soaking time ranges from about 1 minute to about 10 minutes.

In one embodiment, the salt from an organic acid can be selected from the group of acetates, citrates, lactate, tartrates, formiates, propionates, glutamates, ascorbates, succinates, malates or mixtures thereof. In another embodiment, the salt from an organic acid can be selected from the group of sodium acetate, sodium citrate, sodium lactate, sodium tartrate, sodium formiate, sodium propionate, sodium glutamate, sodium ascorbate, sodium succinate, sodium malate or mixtures thereof.

In one embodiment, the salt includes a mixture of organic acid salt and inorganic salt, where the inorganic salt is a neutral inorganic salt and where the neutral inorganic salt is sodium chloride, sodium sulphate or mixtures thereof.

In one embodiment, the packaging is under vacuum or under protective gas, where the protective gas can be, either, carbon dioxide, nitrogen or a mixture of both.

Some embodiments of the present disclosure provide a method for preparing a stabilized longlife non-edible ready-to-stuff collagen casing according to claim 1 that comprises placing the casing in a plastic bag filled with an aqueous solution comprising salt with a total concentration of from about 5% to about 50%, in an amount from about 40% to about 75% in collagen casing basis and removing the air from the plastic bag to vacuum, wherein the salt comprises a salt from an organic acid. In one embodiment, the aqueous solution including the salt has a total concentration from about 10% to about 30%, in an amount from about 55% to about 65% in collagen casing basis. In one embodiment, the position of the bag is changed every day.

In one embodiment, the salt from an organic acid can be selected from the group of acetates, citrates, lactate, tartrates, formiates, propionates, glutamates, ascorbates, succinates, malates or mixtures thereof. IN another embodiment, the salt from an organic acid can be selected from the group of sodium acetate, sodium citrate, sodium lactate, sodium tartrate, sodium formiate, sodium propionate, sodium glutamate, sodium ascorbate, sodium succinate, sodium malate or mixtures thereof.

In one embodiment, the salt includes a mixture of organic acid salt and inorganic salt, where the inorganic salt can be a neutral inorganic salt and where the neutral inorganic salt can be sodium chloride, sodium sulphate or mixtures thereof.

DETAILED DESCRIPTION

Figure 1:
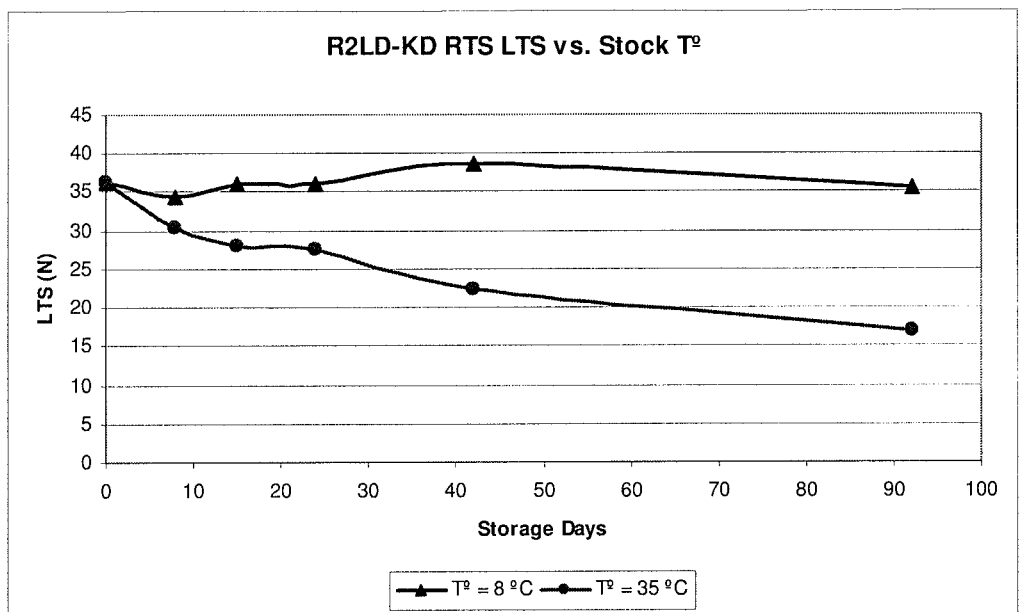
FIG. 1 shows the drop of LTS (Longitudinal Tensile Strength) with the time at two different stock temperatures.

This invention follows the discovery that available commercial non-edible collagen ready-to-stuff casing degrades itself with the stock time, losing clipping and stuffing performance. Casing degradation takes place faster with high stock temperature. Apparently, such degradation is not caused by microbiological agents.

In order to prevent this problem, the present invention provides a stabilized longlife non-edible ready-to-stuff collagen casing characterized in that it comprises a moisture amount between 27% and 50% by weight based on total casing weight and a salt amount between 2,5% and 30% by weight based on dry casing weight, wherein the salt comprises a salt from an organic acid and wherein the casing is packed.

Surprisingly, when salts from organic acids are used, the longitudinal tensile strength of the casing increases, and drops in a much less extent during stock time, than the corresponding casing prepared only with NaCl or other inorganic salts. So, a type of casing stabilization takes place. The degree of this unexpected effect depends on the salt nature and concentration. The higher is the salt concentration in the casing, the higher is the stabilization effect. In addition, salts from organic acids lead to an acceptable casing peelability from the sausage, while unexpectedly casing peelability is significantly worsened when some inorganic salts are used.

A stabilized longlife non-edible collagen ready-to-stuff casing provided herein increases the shelf life of the casing, reducing the risk of casing degradation due to an inappropriate stock and/or delivery conditions, without the necessity of investments and costs associated with the handling of a refrigerated product. Said casing makes more robust and flexible the meat production process.

The stabilized longlife non-edible ready-to-stuff collagen casing of the invention can present straight and round forms and it encompasses those casings manufactured to produce dry, semi-dry or cooked meat products.

The stabilized longlife non-edible collagen casing ready-to-stuff of the invention reduces dramatically the problem of casing degradation during stock and delivery to the customer, with the consequent improvement of stuffing and/or clipping performance at the meat manufacturer's end.

The stabilized longlife non-edible collagen casing herein provided is appropriately moisturized and so it does not need any soaking or moisturizing treatment by the meat manufacturer before stuffing.

In the development of the present non-edible read-to-stuff casing, different factors were taken into account, like compliance with legal regulations, stuffing and clipping performance as at least as good as that of standard casing soaked prior to filling, shelf life of the casing of at least one year without significant change in properties, and flexibility in the production process.

In this sense the stabilized longlife non-edible collagen ready-to-stuff casing, fulfills the requirements of sausage production process, like good stuffing and/or clipping performance, and resistance to the hydrothermal attack, in case of cooked products or following of the volume reduction of the sausage emulsion due to loss of water during maturation process, in case of dry and semi-dry products.

An additional characteristic of the stabilized longlife non-edible collagen ready-to-stuff casing is that it fulfills the requirements of meat products, like good appearance, easy and fast peelability from the meat product, and that it allows a normal and homogeneous mould growth in the sausage surface, in the case of dry products with superficial mould.

The salt from an organic acid to be used in the manufacture of the stabilized longlife non-edible collagen casing is selected from the group of acetates, citrates, lactate, tartrates, formiates, propionates, glutamates, ascorbates, succinates, malates or mixtures thereof. More specifically the salt is preferably selected from the group of sodium acetate, sodium citrate, sodium lactate, sodium tartrate, sodium formiate, sodium propionate, sodium glutamate, sodium ascorbate, sodium succinate, sodium malate or mixtures thereof.

In a preferred embodiment, the stabilized longlife non-edible collagen ready-to-stuff casing, comprises at least two salts, one of them an inorganic salt or mixture of inorganic salts, which reduces significantly casing water activity (Aw), the other salt being a salt from an organic acid, or mixture of salts from different organic acids. The preferred neutral inorganic salts or mixtures of inorganic salts to be used in combination with the salts from organic acids are selected from the group of chlorides or sulphates. The more preferred neutral inorganic salts are sodium chloride, sodium sulphate or mixtures thereof.

One of the preferred embodiments comprises the mixture of the selected salts from organic acids with NaCl, in order to achieve a lower water activity (Aw), and consequently reduce the risk of microbiological degradation during stock time significantly. Additionally, the use of NaCl allows reducing the amount of salts from organic acids, much more expensive than NaCl, resulting in cost reduction of the final product.

In a preferred embodiment of the invention the moisture amount in the ready-to-stuff casing of the invention is between 30% and 40% by weight based on total casing weight.

In another preferred embodiment of the invention the stabilized longlife ready to stuff collagen casing comprises an amount of salt between 6 and 15% by weight, based on dry casing weight.

The stabilized longlife non-edible ready-to-stuff collagen casing according to the invention must be suitably packed in order to isolate the ready-to-stuff casing from the ambient and so prevent any substantial change in the properties of the casing such as for example the moisture content or the salt content. Furthermore, the packaging of the casing reduces significantly the possible degradation due to microbiological factors and improves the hygienic properties of the casing delivered to the meat packer. In a preferred embodiment, the casing is vacuum packed or packed under protective gas, such as carbon dioxide, nitrogen or a mixture of both.

It is another object of the present invention to provide methods of manufacturing said stabilized longlife non-edible collagen casing which avoid an additional soaking step by the meat manufacturer. The stabilized longlife non edible collagen ready-to-stuff casing may be prepared following two different methods, for obtaining a homogeneous and regular product:

(1) In a first and preferred method, casings are presoaked in an aqueous solution containing the mixture of salts, with a total salt concentration between 5% and 50%, and preferably 10% to 30%. The immersion time in the salt solution can be very wide, but preferably ranges between 20 seconds and 30 minutes, and more preferably it ranges between 1 and 10 minutes. After the soaking the casing is packed, preferably under vacuum or under protective gas.

(2) In a second method, similar to that described in U.S. Pat. No. 6,279,737 patent, casings are placed in a plastic bag, filled with an aqueous solution containing the mixture of salts with a total salt concentration between 5 and 50% and preferably 10% to 30%, in an amount between 40% to 75% in collagen casing basis, and more preferably between 55% to 65%. Then air is vacuum removed, and salt aqueous solution is filling all the space. Finally, plastic bag is sealed and placed horizontally during a week for homogeneous salt aqueous solution diffusion and absorption by the casings. In a preferred embodiment the position of packed casing is changed every day, in order to assure a homogeneous distribution of the salt aqueous solution and complete absorption into the collagen casings. The salt concentration and salt type mixture in the salt aqueous solution also regulates the swelling of collagen casing.

The methods for manufacturing stabilized longlife non-edible collagen ready-to-stuff casing, are carried out on casings normally with an initial casing salt content about 0,2 to 2% dry weight basis, and humidity about 10 to 13%, when a conventional reel is used, and about 19 to 22%, when a shirred casing is used.

In both methods, it has been observed that the higher the salt concentration of the solution, the lower the collagen casing water absorption and vice versa. Depending on casing initial conditions, and casing and converting type, a suitable concentration of salts has to be selected, in order to absorb the desired quantity of water by the collagen casings. In the case of first method, water absorption can be also regulated by adjusting soaking time.

EXAMPLES

This invention will be clearer when considering the following examples which are merely illustrative and, in no manner, are to be considered as limitation of the present invention. In most of the examples, for the sake of comparison, a ready-to-stuff casing sample prepared by soaking in 12-15% brine solution is introduced as a control reference of the prior art impregnation.

Longitudinal tensile strength of the casing prepared according to the present invention was analyzed as a descriptor of stuffing and clipping performance, so the higher the tensile strength, the better the casing performance during filling. Additionally, casings were tested in a stuffing machine, and dry sausages were prepared. Peelability of the casing from the meat emulsion was evaluated. In order to speed up the test results, non edible collagen ready-to-stuff casings were placed at high temperature, preferably between 35 to 45° C., for long time stock conditions simulation. The following methods were used for calculating the parameters assessed in the examples.

Method of Casing Tensile Strength Determination

Determination of casing Longitudinal Tensile Strength was performed by the following procedure:
1. Preparation of casing stripes of ready-to-stuff casing, by cutting directly (without any previous manipulation), with a special cutter device, that yields a sample of 15 mm width and 100 mm length.
2. Stripe is placed with the original humidity in the clamps of a tensiometer UTS 3.
3. Clamps pressure=5 bar.
4. Double filter paper layers are placed between sample and UTS clamps.
5. Distance between clamps=50 mm
6. Elongation rate=500 mm/min.
7. Measurement of tensile stress (in Newton) and elongation (in %) at rupture point.

Method of Casing Water Activity (Aw) Determination

Determination of casing Aw was performed by following procedure:
1. A piece of flat casing was placed on a special pad and covered by a measuring head, of the instrument Rotronic-Hygroskop BT.
2. Measurement was made until having a constant value of relative humidity in the display.
3. Aw was calculated to be equal to relative humidity/100.

Salt Concentration in Ready-To-Stuff Casings

In order to define the range of salt concentration of the ready-to-stuff casing, a different calculation has been done, depending on the method used for its preparation.

Method 1: Casing Soaking in a Salt Solution.

Initial and final casing humidity and weight are measured, and humidity difference was used for calculation of how much soaking solution was absorbed per weight unit of casing. Considering homogeneous soaking solution absorption, a calculation of salt in relation with total ready-to-stuff casing weight was made.

Method 2: Salt Solution is Added to the Casing During Packaging.

Initial casing humidity and weight is measured, and knowing the amount of salt solution is added per casing weight unit, a calculation of salt in relation with total ready-to-stuff casing weight was made.

Example 1

Instability of Prior Art Non-edible Ready-to Stuff Collagen Casing

In this example a casing quality problem, regarding weakness of filling of two ready-to-stuff collagen casings produced by Naturin GmbH & Co casing Manufacturer Company is presented. Due to previous claims received from the market, it was implemented a measurement of longitudinal tensile strength cross-check of stocked material before delivery to the customer. As shown in Table 1, the casings showed a drop in longitudinal tensile strength of around −20%, in relation with the initial average value.

TABLE 1

Claim of ready-to-stuff casing due to weakness on filling.

| Batch N° | Casing type | Calibre | % LTS Drop |
|---|---|---|---|
| 505021 | R2LD-KD RTS | 52 | −20.9% |
| 503537 | R2LD-KD RTS | 58 | −18.9% |

(*) LTS = Longitudinal Tensile Strength

In the corresponding report, prepared by Naturin GmbH & Co Quality department, it was concluded to recommend not to deliver both casing batches due to the risk of weak on filling at the customer, and they remarked that "certain storage conditions can have a negative influence on the RTS casing".

Example 2

Effect of Stock Temperature in Instability of Prior Art Non-edible Ready-to-stuff Collagen Casing In this example, different ready-to-stuff casings were stocked at different temperatures, and the decrease of casing Longitudinal Tensile Strength with the stock time was analyzed.

(a) R2LD-KD RTS caliber 52 casing. In Table 2 & FIG. 1 the drop of LTS with the time at two different stock temperatures is shown.

TABLE 2

LTS (N) of a R2LD-KD RTS 52 casing prepared by soaking shirred casing during 2 min in NaCl 12.5%.

| Storage days | T° = 8° C. | T° = 35° C. |
|---|---|---|
| 0 | 36.2 | 36.2 |
| 8 | 34.4 | 30.5 |
| 15 | 36 | 28.1 |
| 24 | 36 | 27.5 |
| 42 | 38.6 | 22.3 |
| 92 | 35.5 | 16.9 |

Figure 2:
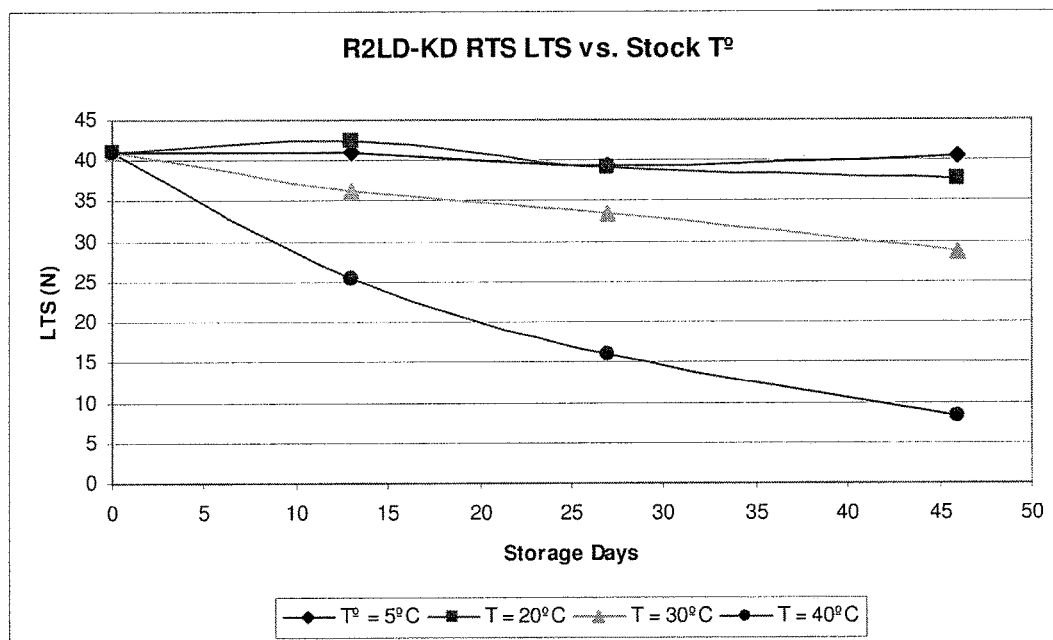
FIG. 2 shows the drop of LTS with the time at four different stock temperatures.
Figure 3:
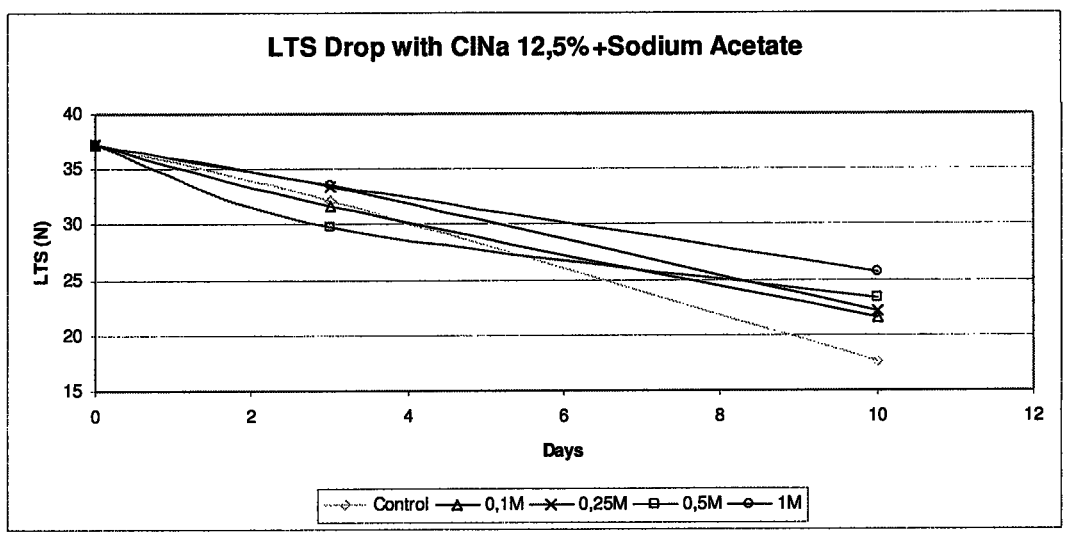
FIGS. 3-6 show the evolution of LTS with the stock time of the different salt mixtures.
Figure 4:
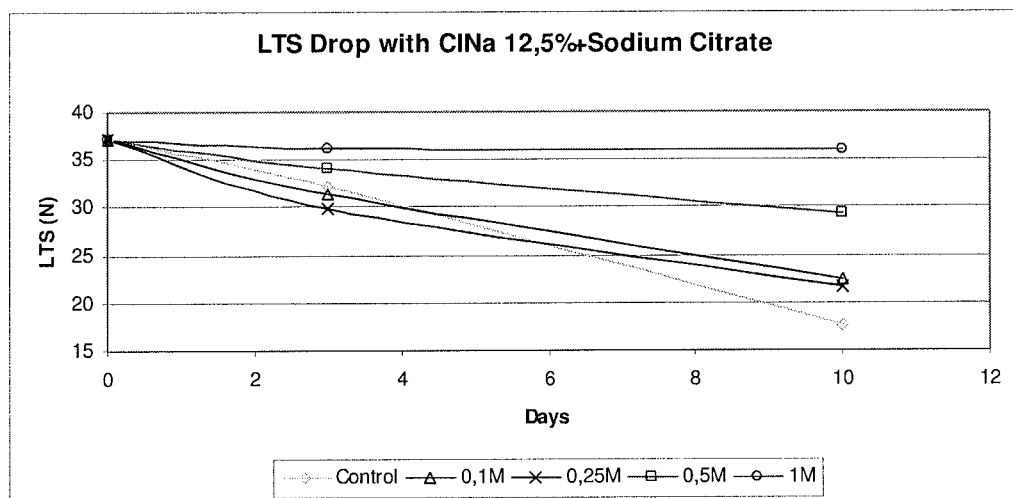
Figure 5:
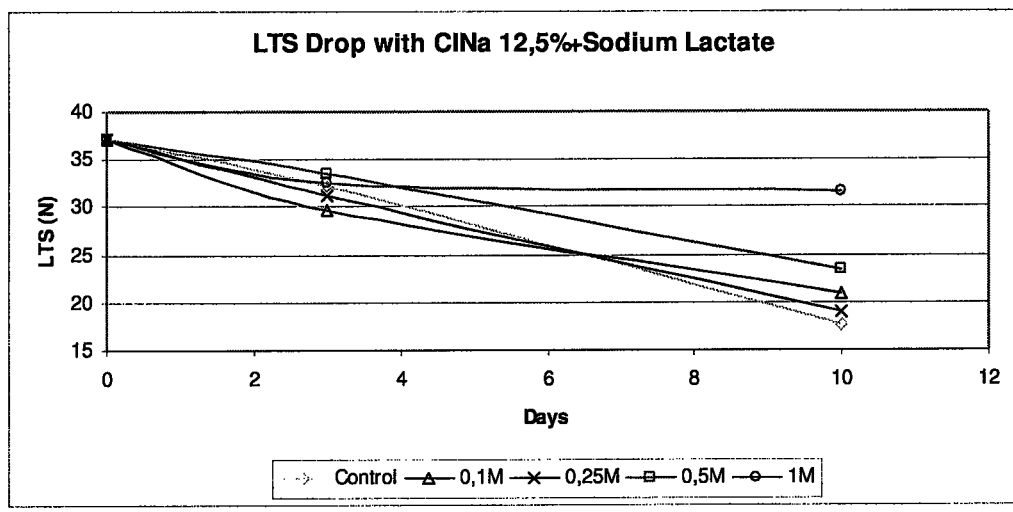
Figure 6:
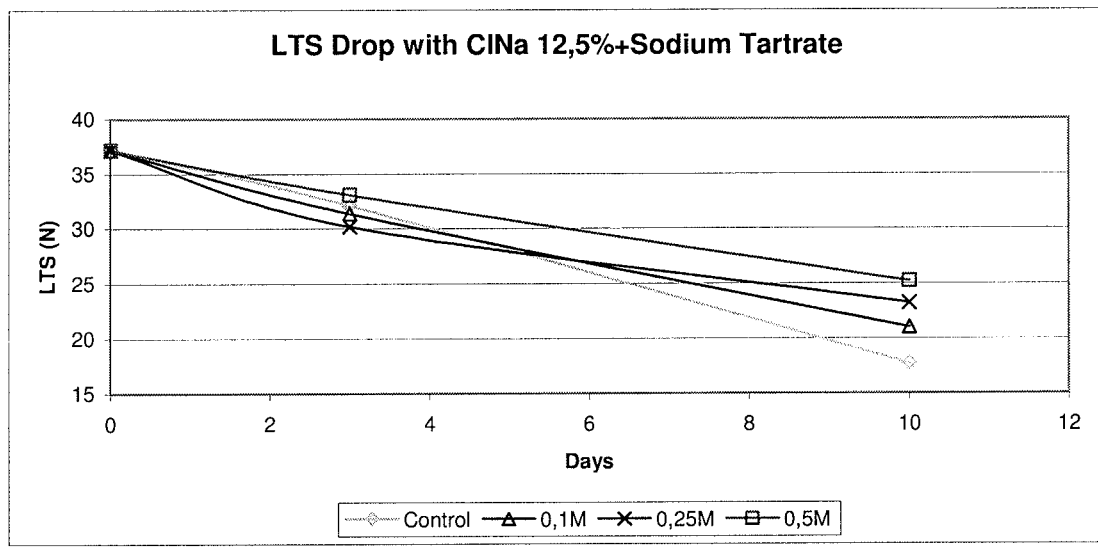

(b) R2LD-KD RTS caliber 58 casing soaked in saturated NaCl. In Table 3 & FIG. 2 we can follow the drop of LTS with the time at four different stock temperatures.

TABLE 3

LTS (N) of a R2LD-KD RTS 58 casing prepared by soaking flat casing during 1 min in saturated NaCl brine.

| Storage days | T° = 5° C. | T = 20° C. | T = 30° C. | T = 40° C. |
|---|---|---|---|---|
| 0 | 41.0 | 41.0 | 41.0 | 41.0 |
| 13 | 40.9 | 42.3 | 36.2 | 25.4 |
| 27 | 39.3 | 39.0 | 33.5 | 16.0 |
| 46 | 40.5 | 37.6 | 28.8 | 8.2 |

It can be concluded that the higher is the stock temperature, the higher is the collagen hydrolysis, and lower is the corresponding casing longitudinal tensile strength.

In order to speed up the tests results, in the next examples the samples of casing were placed at high temperature, preferably between 40 to 45° C., and analyzed after stock of 7 to 10 days.

Example 3

Comparative Example Showing the Drop of LTS with Stockage Time of Prior Art Non-edible Ready-to-stuff Collagen Casing from Different Manufacturers Several non-edible ready-to-stuff casings from the market, produced by three different casing manufacturer firms, were taken and placed during a week at 45° C. LTS was analyzed at the beginning and after the stock treatment, and the LTS drop was calculated in percentage. In Table 4, it is shown that independently of casing type or manufacturer, commercialized non-edible ready-to-stuff casings showed a meaningful drop in LTS with the stock time.

TABLE 4

LTS drop in % of non-edible ready-to-stuff casings, placed one week at 45° C.

| Casing Manufacturer | Casing Type | LTS drop % |
|---|---|---|
| AB Tripasin | TR-DK-Z | −39% |
| Devro plc - Cutisin | CRC RTU | −22% |
| Devro plc - Cutisin | 014 | −74% |
| Naturin GmbH & Co | R2LD | −30% |
| Naturin GmbH & Co | KD | −30% |
| Naturin GmbH & Co | EWD-KD | −30% |
| Naturin GmbH & Co | R2LD-KD | −45% |

Example 4

LTS Drop with Stockage Time in the Presence of Antimicrobial Agents or After Packaging in a Protective Gas Atmosphere Different non-edible ready-to-stuff casings were prepared with different antimicrobial agents, stocked at 45° C. between 8 to 11 days, and compared with the corresponding controls. Casing LTS was measured at the beginning of the test and after the stock at high temperature, and the corresponding LTS drop was calculated in percentage.

(a) R2L-D KD caliber 47 was soaked in brine in presence of different amounts of chlorine dioxide as antimicrobial agent. In Table 5 it is clear that the LTS drop of the control is similar to that of the casing treated with chlorine dioxide, after stocking the casing 8 days at 45° C.

TABLE 5

LTS drop in % of R2LD-KD 47 soaked 1 minute in brine with and without $ClO_2$.

| Soaking solution | LTS Drop % |
|---|---|
| NaCl 12.5% (control) | −57% |
| NaCl 12.5% + 1 ppm $ClO_2$ | −59% |
| NaCl 12.5% + 2.5 ppm $ClO_2$ | −63% |
| NaCl 12.5% + 5 ppm $ClO_2$ | −61% |

(b) R2L-D KD caliber 58 was soaked in brine in presence of potassium sorbate. Again in table 6 the LTS drop of the control is similar to that of the casing treated with potassium sorbate, after stocking the casing 11 days at 45° C.

TABLE 6

LTS drop in % of R2LD-KD 58 flat casing soaked 20 seconds in brine with and without potassium sorbate.

| Soaking solution | LTS Drop % |
|---|---|
| NaCl 12.5% (control) | −66.6% |
| NaCl 12.5% + 2% potassium sorbate | −73.7% |

(c) R2L-D KD RTS caliber 38 and R2L-D caliber 70 RTS casings were packed in gas mixture of 70% nitrogen and 30% $CO_2$, and stocked during 8 days at 45° C. Table 7 shows that after this stock time, LTS drop of casing packed with inert gas atmosphere was in similar % range as the corresponding control.

TABLE 7

LTS drop in % of R2L-D KD and R2L-D ready-to-stuff casings packed in inert gas atmosphere after 8 days stock at 45° C.

| Casing type | LTS Drop % |
|---|---|
| R2L-D KD RTS packed in air (control I) | −45% |
| R2L-D KD RTS packed with inert gas | −44% |
| R2L-D RTS packed in air (control II) | −30% |
| R2L-D RTS packed with inert gas | −33% |

It is concluded that degradation of non-edible collagen ready-to-stuff casings is apparently not caused by any microbial agent.

Example 5

Stabilization Effect of Different Salts in Ready-to-stuff Casings

In this example, several R2LD-KD caliber 47 ready-to-stuff casings were prepared by soaking the shirred casing in different salt solutions. Saturated solutions were used (i.e. the highest attainable concentrations of compounds in the solutions), to show the highest achievable effect of these soaking solutions on the casing. Soaking time was varied, in order to get a ready-to-stuff casing in the humidity range claimed by the patent EP 1018301. Afterwards, the different casing samples were stocked one week at 45° C., and LTS was measured at the beginning of the test and after one week stock at high temperature. The corresponding LTS drop was calculated in percentage, in two different ways: (G) in relation with the initial LTS of each sample, and (H) in relation with the initial LTS of the control (NaCl 15%). In Table 8 it is shown the results compilation.

Surprisingly, when other inorganic salts different from NaCl are used, casing is significantly weakened, and the starting LTS is lower than the control. On the other hand, when salts from organic acids are used in the soaking bath, the casing is stronger after soaking, showing even a starting LTS higher than the control. In addition, LTS drop is much smaller than the control, or even no drop at all takes place. Unexpectedly, non-edible collagen ready-to-stuff casing is stabilized by using salts from organic acids.

Example 6

Stabilization Effect of Different Salts Mixed with NaCl in Ready-to-stuff Casings In this example, different salts in the soaking bath, in combination with NaCl 12,5%, were tested. A R2LD-KD caliber 52 was soaked in the different soaking solutions during 1 min. Casings were placed at 45° C., and LTS was measured after 10 days stock time. Table 9 shows final LTS drop in percentage after stock test, casing humidity and pH. In addition, some sausages were prepared with each casing sample and casing peel-ability was evaluated.

TABLE 9

LTS drop in % of R2LD-KD 52 soaked for 1 minute in a bath with NaCl 12.5% and other different salts.

| Soaking solution | RTS casing pH | RTS casing humidity (%) | LTS Drop % |
|---|---|---|---|
| NaCl 12.5% (Control) | 3.04 | 35.9 | −63.3% |
| NaCl 12.5% + Na-acetate 10% | 4.05 | 35.9 | −24.0% |
| NaCl 12.5% + Na$_3$-citrate 10% | 3.87 | 31.8 | −27.9% |
| NaCl 12.5% + Na-lactate 10% | 3.65 | 30.4 | −31.9% |
| NaCl 12.5% + Na$_2$-tartrate 10% | 3.48 | 29.7 | −24.7% |

TABLE 8

R2LD-KD 47 casing parameters after soaking in different salt type solutions.

| (A) Soaking solution | (B) Soaking time (min.) | (C) RTS casing humidity (%) | (D) LTS (N) before stock test | (F) LTS (N) after stock 7 days/45° C. | (G) LTS Drop % | (H) LTS Drop % Control basis |
|---|---|---|---|---|---|---|
| NaCl 15% (control) | 8 | 43.7 | 38.6 | 16.8 | −56.5% | −56.5% |
| Na-acetate sat. | 8 | 30.9 | 39.8 | 35.6 | −10.6% | −7.8% |
| Na$_3$-citrate sat. | 12 | 36.5 | 48.3 | 48.5 | +0.4% | +25.6% |
| Na Lactate 50% | 12 | 30.5 | 41.3 | 38.2 | −7.5% | −1.0% |
| Na$_2$-tartrate sat. | 4 | 34.1 | 40.8 | 36.1 | −11.5% | −6.5% |
| Na-formiate sat. | 12 | 36.0 | 48.1 | 45.6 | −5.2% | +18.1% |
| Na-propionate sat. | 8 | 28.4 | 38.6 | 35.0 | −9.3% | −9.3% |
| Na-glutamate sat. | 10 | 28.9 | 45.7 | 34.9 | −23.6% | −9.6% |
| Na-ascorbate sat. | 10 | 27.4 | 39.3 | 33.4 | −15.0% | −13.5% |
| Na-succinate sat. | 10 | 27.6 | 42.8 | 38.5 | −10.0% | −0.3% |
| Na$_3$PO$_4$ sat. | 8 | 45.2 | 28.9 | 25.9 | −10.4% | −32.9% |
| NaHCO$_3$ sat. | 8 | 43.3 | 32.8 | 25.9 | −20.6% | −32.9% |
| Na$_2$SO$_4$ sat. | 8 | 38.2 | 35.3 | 28.7 | −18.7% | −25.6% |

(sat. = saturated)

TABLE 9-continued

LTS drop in % of R2LD-KD 52 soaked for 1 minute in a bath with NaCl 12.5% and other different salts.

| Soaking solution | RTS casing pH | RTS casing humidity (%) | LTS Drop % |
|---|---|---|---|
| NaCl 12.5% + 0.5 M NaHCO$_3$ | 3.45 | 28.3 | −17.0% |
| NaCl 12.5% + 0.5 M NaOH | 4.36 | 37.8 | −46.9% |
| NaCl 12.5% + 0.2 M Na$_3$PO$_4$ | 3.74 | 36.0 | −28.2% |

As mentioned before, salami sausages were prepared with the different casing samples. After 3 weeks of maturation, casing peel-ability from the meat emulsion was evaluated. Scale is ranging from (1) very good, to (6) very bad, considering as acceptable by the customer when this value is ≤3. In Table 10 we have compiled the results, showing that surprisingly casing peelability is worse when an inorganic salt is used together with the NaCl. Result is an average of four different expert people's evaluation.

TABLE 10

Evaluation of casing peel-ability from the meat emulsion (scale: 1-6).

| Soaking solution | Peeling (1-6) |
|---|---|
| NaCl 12.5% (Control) | 1 |
| NaCl 12.5% + Na-acetate 10% | 3 |
| NaCl 12.5% + Na$_3$-citrate 10% | 2.5 |
| NaCl 12.5% + Na-lactate 10% | 3 |
| NaCl 12.5% + Na$_2$-tartrate 10% | 1.5 |
| NaCl 12.5% + 0.5 M NaHCO$_3$ | 4 |
| NaCl 12.5% + 0.5 M NaOH | 4 |
| NaCl 12.5% + 0.2 M Na$_3$PO$_4$ | 3.5 |

Example 7

Stabilization Effect of Different Salts from Organic Acids in Ready-to-stuff Casings Different R2LD-KD caliber 47 ready-to-stuff casings were prepared by soaking during 8 minutes the shirred casing in different salts from organic acids solutions with the same Normal concentration. Normal concentration was used for achieving same effect of soaking solutions regarding the amount of ionic charge. Two different controls were made, (1) NaCl 1 N bath and (2) NaCl 12,5% (2,1 N). After soaking casings were stocked at 45° C. during 8 days. LTS was measured at the beginning and at the end of the stock test. From each casing sample, two types of dry sausages were prepared, first one without surface mould curing, and second one with surface mould curing. After the sausage process maturation, an evaluation of casing peelability was performed in the way it is explained in Example 6. In the second type of sausages a good mould surface development was observed in all the cases, but in the case of sodium propionate, such mould development was slower than the control. In Table 11 there is written the results compilation.

TABLE 11

R2LD-KD 47 casing parameters after soaking in different 1N salts from organic acids solutions.

| Soaking solution | RTS casing humidity (%) | LTS (N) before stock test | LTS (N) after stock 8 days/45° C. | LTS Drop % | Peeling (1-6) |
|---|---|---|---|---|---|
| NaCl 1 N (control I) | 36.2 | 35.3 | 16.0 | −54.7% | 2 |
| Na-acetate 1 N | 36.3 | 36.1 | 29.8 | −17.5% | 2 |
| Na$_3$-citrate 1 N | 38.8 | 32.0 | 23.9 | −25.3% | 1.25 |
| Na Lactate 1 N | 37.1 | 35.7 | 28.5 | −20.2% | 1.75 |
| Na$_2$-tartrate 1 N | 36.2 | 34.4 | 27.3 | −20.6% | 2 |
| Na-formiate 1 N | 38.3 | 35.7 | 29.1 | −18.5% | 1.5 |
| Na-propionate 1 N | 35.9 | 37.8 | 29.9 | −20.9% | 2 |
| Na$_2$-malate 1 N | 39.3 | 34.0 | 24.6 | −27.6% | 1.5 |
| NaCl 12.5% = 2.1 N (Control II) | 34.3 | 41.5 | 20.9 | −49.6% | 2 |

Results show again that the use of salts from organic acids in the preparation of a non-edible collagen ready-to-stuff casing increases significantly the stability of the casing during stock. Degradation of both NaCl control casings is in the same level, even when control II has more than double salt concentration than control I. This result confirms the one of example 5.

Example 8

Concentration Stabilization Effect of Salts from Organic Acids in Ready-to-stuff Casings, in Mixture with 2,1 M NaCl In this example several salts from organic acids were chosen and put in the soaking bath at different concentrations, in combination with NaCl 12,5%. A R2LD-KD caliber 47 was soaked in the different soaking solutions for a period ranging 5 to 7 minutes, in order to get a final casing humidity into the range claimed in the patent EP 1018301. Casings were placed at 45° C., and LTS was measured after 3 and 10 days stock time. FIGS. 3, 4, 5 and 6 show the evolution of LTS with the stock time of the different salt mixtures. In addition, some salami sausages were prepared with each casing sample and casing peelability was evaluated after 3 weeks of sausage maturation. Results are compiled in Table 12.

TABLE 12

Evaluation of casing peel-ability from the meat emulsion (scale: 1-6)

| Soaking solution | Peeling (1-6) |
|---|---|
| NaCl 12.5% (Control) (2.1 M) | 2 |
| NaCl 12.5% + Na-acetate 0.1M | 2 |
| NaCl 12.5% + Na-acetate 0.25M | 2 |
| NaCl 12.5% + Na-acetate 0.5M | 2 |
| NACL 12.5% + NA-ACETATE 1M | 2 |
| NaCl 12.5% + Na$_3$-citrate 0.1M | 3 |
| NaCl 12.5% + Na$_3$-citrate 0.25M | 3 |
| NaCl 12.5% + Na$_3$-citrate 0.5M | 2 |
| NACL 12.5% + NA$_3$-CITRATE 1M | 2 |
| NaCl 12.5% + Na-lactate 0.1M | 1.5 |
| NaCl 12.5% + Na-lactate 0.25M | 1.5 |
| NaCl 12.5% + Na-lactate 0.5M | 1.5 |
| NACL 12.5% + NA-LACTATE 1M | 2 |
| NaCl 12.5% + Na$_2$-tartrate 0.1M | 2.5 |
| NaCl 12.5% + Na$_2$-tartrate 0.25M | 2.5 |
| NACL 12.5% + NA$_2$-TARTRATE 0.5M | 2 |

As observed from FIGS. 3, 4, 5 and 6, the stabilization effect in the casing of each salt is different, and in this example conditions it is the tri-sodium citrate that shows better stabilization results. The higher the organic acid salt concentration, the bigger the stabilization effect, and in all the cases this effect is significant when their concentration is ≥0,5 M.

The use of salts from organic acids in the preparation of non-edible ready-to-stuff casings has no significant negative effect in the peelability performance of the casing from the meat emulsion, as is showed in Table 12.

Example 9

Effect of Different Organic and Inorganic Salts in Water Activity (Aw)

The use of a mixture of a salt from an organic acid with a neutral inorganic salt is preferred, because such inorganic salt is able to reduce the casing water activity (Aw) to a higher extent leading to a bigger resistance of the non-edible collagen ready-to-stuff casing to microbiological degradation during stock. In addition, the use of a cheap neutral inorganic salt, like NaCl, allows using less concentration of the salts from organic acids, which are more expensive products, with the consequent cost reduction of non-edible collagen ready-to-stuff casing production.

Shirred strands of R2L-D-KD caliber 47 casing were taken, placed in a plastic bag, and added different percentage of soaking solutions in relation to initial casing weight for obtaining a final humidity in the range of 38 to 48%, as it is described in Table 13. Then air was removed, and the plastic bag was sealed. Packed casing was stored for one week, and its position was changed every day, in order to have homogeneous salt solution absorption by the casing.

TABLE 13

R2L-D-KD caliber 47 casing water activity when prepared with NaCl, sodium acetate and tri-sodium citrate at different concentrations.

| Soaking Solution | % Salt in Casing weight basis | RTS Casing humidity (%) | RTS Casing Aw |
|---|---|---|---|
| NaCl 5% | 46.0% | 42.8% | 0.84 |
| NaCl 10% | 50.0% | 43.4% | 0.84 |
| NaCl 15% | 56.0% | 39.5% | 0.82 |
| NaCl 20% | 63.0% | 40.0% | 0.78 |

TABLE 13-continued

R2L-D-KD caliber 47 casing water activity when prepared with NaCl, sodium acetate and tri-sodium citrate at different concentrations.

| Soaking Solution | % Salt in Casing weight basis | RTS Casing humidity (%) | RTS Casing Aw |
|---|---|---|---|
| Na-acetate 5% | 46.0% | 45.7% | 0.87 |
| Na-acetate 10% | 50.0% | 46.3% | 0.86 |
| Na-acetate 15% | 56.0% | 41.3% | 0.86 |
| Na-acetate 20% | 63.0% | 46.3% | 0.85 |
| Na-acetate 30% | 83.0% | 47.2% | 0.84 |
| Na-acetate 40% | 125.0% | 46.3% | 0.81 |
| Na$_3$-citrate 5% | 46.0% | 38.9% | 0.85 |
| Na$_3$-citrate 10% | 50.0% | 46.2% | 0.86 |
| Na$_3$-citrate 15% | 56.0% | 42.2% | 0.86 |
| Na$_3$-citrate 20% | 63.0% | 38.6% | 0.85 |
| Na$_3$-citrate 30% | 83.0% | 42.9% | 0.85 |
| Na$_3$-citrate 40% | 125.0% | 44.0% | 0.83 |

As it is showed in Table 12, non-edible collagen ready-to-stuff casing water activity is smaller when NaCl is used, and as a consequence casing will resist better the microbiological degradation during stock.

Example 10

Figure 7:
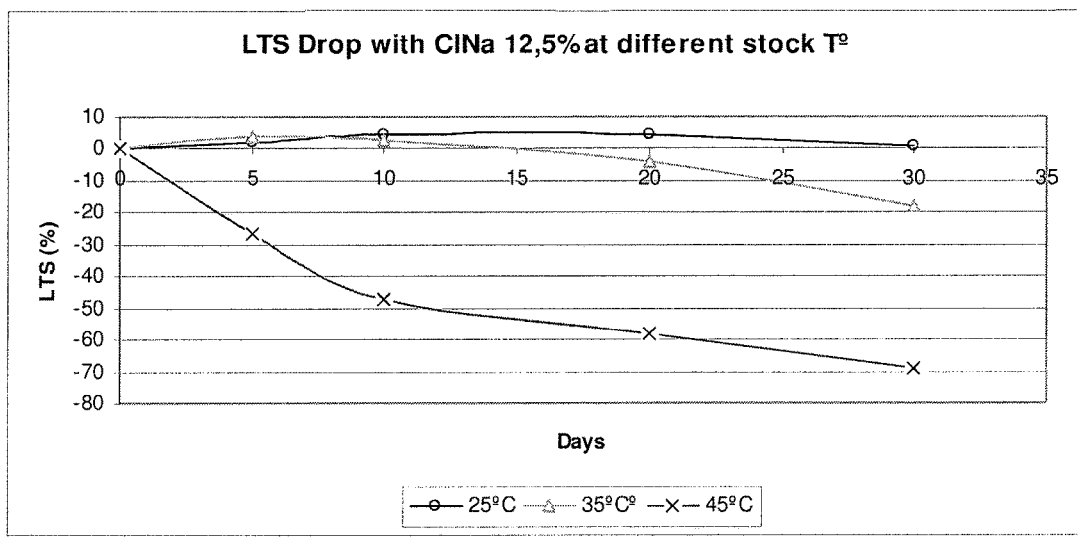
FIGS. 7-9 show LTS drop percentages.
Figure 8:
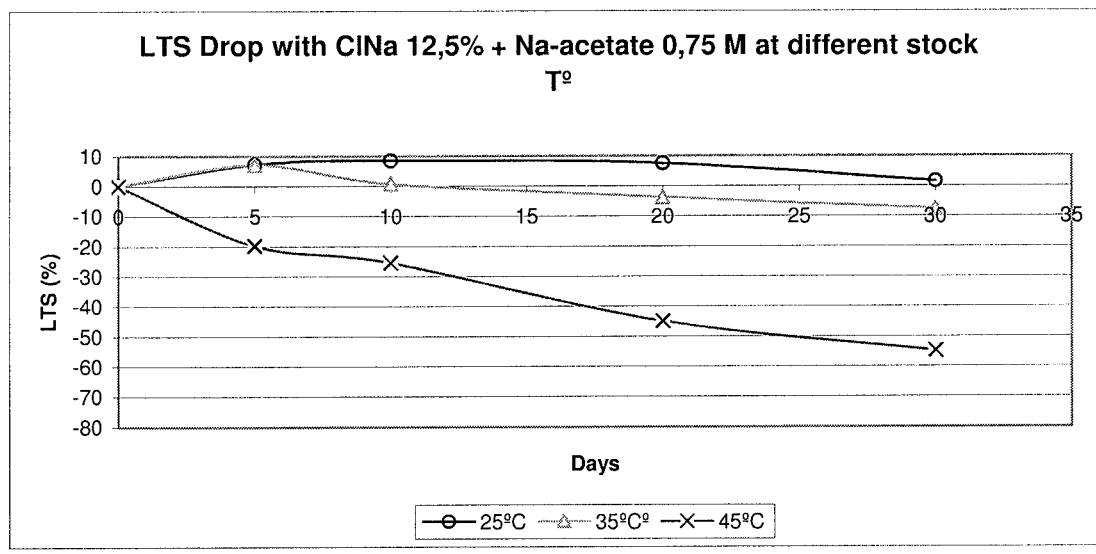
Figure 9:
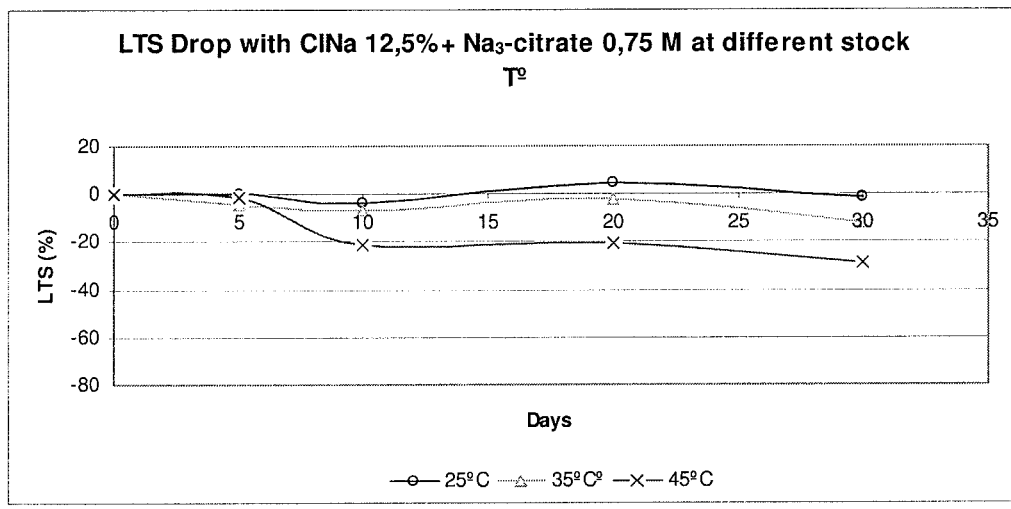

Effect of Stock Temperature in Ready-to-stuff Collagen Casing Soaked in NaCl/Sodium Acetate and NaCl/Trisodium Citrate Mixtures In this example different R2L-D-KD caliber 47 ready-to-stuff casing samples were prepared by soaking shirred casing during 10 min in (1) NaCl 12,5%, (2) NaCl 12,5% & sodium acetate 0,75 M, and (3) NaCl 12,5% & tri-sodium citrate 0,75 M. Obtained samples were stocked at 25, 35 and 45° C., and LTS was analyzed after 5, 10, 20 and 30 days. LTS drop percentages are plotted in FIGS. 7, 8 and 9.

In all the cases, LTS drop increases with the stock time and temperature. Such LTS drop is much more pronounced when only NaCl is used, and it is smaller when a mixture of NaCl with sodium acetate or tri-sodium citrate is applied.

Example 11

Stabilization Effect of Different Salts from Organic Acids Mixtures in Ready-to-stuff Casings We have chosen salts from three different organic acids (sodium lactate, sodium acetate and tri-sodium citrate) and prepared four soaking solutions with different mixtures of above mentioned salts from organic acids, with a total salt concentration of 30%. As a control, a brine solution of NaCl 12,5% was prepared. R2L-D-KD caliber 47 shirred casing was soaked 5 min. in the case of NaCl solution, and 10 min. in the case of the salts from organic acids soaking solutions, in order to obtain a ready-to-stuff casing with humidity in the range of 27 to 32%. Just after soaking, casing samples were packed in a plastic bag, closed and stocked at 45° C. during 8 days. LTS was measured at the beginning and at the end of the stock test. The corresponding LTS drop was calculated in percentage, in two different ways: (F) in relation with the initial LTS of each sample, and (G) in relation with the initial LTS of the control (NaCl 12.5%). Table 14 shows the results compilation.

TABLE 14

R2LD-KD 47 casing parameters after soaking in different salt type solutions.

| (A) Soaking solution | (B) RTS casing humidity (%) | (C) LTS (N) before stock test | (D) LTS (N) after stock 8 days/45° C. | (F) LTS Drop % | (G) LTS Drop % Control basis |
|---|---|---|---|---|---|
| NaCl 15% (control) (2.5 M) | 30.9 | 37.9 | 27.3 | −28.0% | −28.0% |
| Na$_3$-citrate 10% + Na-acetate 10% + Na-lactate 10% (2.5 M) | 28.9 | 43.3 | 40.7 | −6.0% | +7.4% |
| Na$_3$-citrate 15% and Na-acetate 15% (2.4 M) | 30.0 | 42.9 | 42.2 | −1.6% | +11.3% |
| Na$_3$-citrate 15% and Na Lactate 15% (1.9 M) | 28.1 | 42.4 | 39.0 | −8.0% | +2.9% |
| Na-acetate 15% and Na Lactate 15% (3.2 M) | 27.8 | 40.2 | 37.7 | −6.2% | −0.5% |

The use of mixtures of different salts from organic acids in preparation of a non-edible collagen ready-to-stuff casing, leads also to a starting LTS bigger than the control. Additionally, LTS drop is much smaller than the control. This result could be the consequence of a positive synergistic effect of using different salts from organic acids for casing stabilization.

What is claimed is:

1. A stabilized, longlife, non-edible, ready-to-stuff collagen casing that comprises a moisture amount of about 40% by weight based on total casing weight, a sodium salt comprising NaCl and a salt of an organic acid in an amount of 1.8% to 5.2% by weight on a dry casing basis, and a total salt concentration in the casing in an amount of 7.6% to 11%; and
    wherein the casing is packed, and the salt of the organic acid is selected from the group consisting of acetates lactates and mixtures thereof.

2. The stabilized, longlife, non-edible, ready-to-stuff collagen casing according to claim 1, where the sodium salt further comprises an additional inorganic salt.

3. The stabilized, longlife, non-edible, ready-to-stuff collagen casing according to claim 1, where the casing is vacuum packed or packed under protective gas.

4. The stabilized, longlife, non-edible, ready-to-stuff collagen casing according to claim 3, where the protective gas is, either, carbon dioxide, nitrogen or a mixture of both.

5. A stabilized, longlife, non-edible, ready-to-stuff collagen casing that comprises a moisture amount of about 40% by weight based on total casing weight, a sodium salt comprising NaCl and sodium citrate in an amount of 6.0% to 13.1% by weight on a dry casing basis, and a total salt concentration in the casing in an amount of 11.8% to 18.9%; wherein the casing is packed.

6. The stabilized, longlife, non-edible, ready-to-stuff collagen casing according to claim 5, where the sodium salt further comprises an additional inorganic salt.

7. The stabilized, longlife, non-edible, ready-to-stuff collagen casing according to claim 5, where the casing is vacuum packed or packed under protective gas.

8. The stabilized, longlife, non-edible, ready-to-stuff collagen casing according to claim 5, where the protective gas is, either, carbon dioxide, nitrogen or a mixture of both.

9. A stabilized, longlife, non-edible, ready-to-stuff collagen casing that comprises a moisture amount of about 40% by weight based on total casing weight, a sodium salt comprising NaCl and sodium tartrate in an amount of about 4.4% by weight on a dry casing basis, and a total salt concentration in the casing in an amount of about 10.2%; wherein the casing is packed.

10. The stabilized, longlife, non-edible, ready-to-stuff collagen casing according to claim 9, where the sodium salt further comprises an additional inorganic salt.

11. The stabilized, longlife, non-edible, ready-to-stuff collagen casing according to claim 9, where the casing is vacuum packed or packed under protective gas.

12. The stabilized, longlife, non-edible, ready-to-stuff collagen casing according to claim 9, where the protective gas is, either, carbon dioxide, nitrogen or a mixture of both.

13. A method for preparing a stabilized, longlife, non-edible, ready-to-stuff collagen casing according to claim 1, comprising soaking the casing in an aqueous solution comprising the sodium salt in a total concentration from about 5% to about 50% for a period of time ranging from about 20 seconds to about 30 minutes and packaging the resulting casing, wherein the sodium salt comprises at least the salt from the organic acid and sodium chloride.

14. The method according to claim 13, where the soaking time ranges from about 1 minute to about 10 minutes.

15. The method for preparing a stabilized, longlife, non-edible, ready-to-stuff collagen casing according to claim 13, wherein the soaking comprises placing the casing in a plastic bag filled with an aqueous solution comprising the sodium salt with a total concentration of from about 5% to about 50%, in an amount from about 40% to about 75% in collagen casing basis and removing the air from the plastic bag to vacuum.

16. The method according to claim 15, where the aqueous solution comprising the sodium salt has a total concentration from about 10% to about 30%, in an amount from about 55% to about 65% in collagen casing basis.

17. The method according to claim 15, where the position of the bag is changed every day.

18. A method for preparing a stabilized, longlife, non-edible, ready-to-stuff collagen casing according to claim 5, comprising soaking the casing in an aqueous solution comprising the sodium salt in a total concentration from about 5% to about 50% for a period of time ranging from about 20 seconds to about 30 minutes and packaging the resulting casing, wherein the sodium salt comprises at least the salt from the organic acid and sodium chloride.

19. The method according to claim 18, where the soaking time ranges from about 1 minute to about 10 minutes.

20. The method for preparing a stabilized, longlife, non-edible, ready-to-stuff collagen casing according to claim 18, wherein the soaking comprises placing the casing in a plastic bag filled with an aqueous solution comprising the sodium salt with a total concentration of from about 5% to about 50%, in an amount from about 40% to about 75% in collagen casing basis and removing the air from the plastic bag to vacuum.

21. The method according to claim 20, where the aqueous solution comprising the sodium salt has a total concentration from about 10% to about 30%, in an amount from about 55% to about 65% in collagen casing basis.

22. The method according to claim 20, where the position of the bag is changed every day.

23. A method for preparing a stabilized, longlife, non-edible, ready-to-stuff collagen casing according to claim 9, comprising soaking the casing in an aqueous solution comprising the sodium salt in a total concentration from about 5% to about 50% for a period of time ranging from about 20 seconds to about 30 minutes and packaging the resulting casing, wherein the sodium salt comprises at least the salt from the organic acid and sodium chloride.

24. The method according to claim 23, where the soaking time ranges from about 1 minute to about 10 minutes.

25. The method for preparing a stabilized, longlife, non-edible, ready-to-stuff collagen casing according to claim 23, wherein the soaking comprises placing the casing in a plastic bag filled with an aqueous solution comprising the sodium salt with a total concentration of from about 5% to about 50%, in an amount from about 40% to about 75% in collagen casing basis and removing the air from the plastic bag to vacuum.

26. The method according to claim 25, where the aqueous solution comprising the sodium salt has a total concentration from about 10% to about 30%, in an amount from about 55% to about 65% in collagen casing basis.

27. The method according to claim 25, where the position of the bag is changed every day.

* * * * *